3,394,061
TIN RECOVERY
Elbert Murry De Forest, Walter Carling Bradbury, and Ted William Royer, Wichita, Kans., assignors to Vulcan Detinning Division, a division of Vulcan Materials Company, Sewaren, N.J., a corporation of New Jersey
Filed Nov. 23, 1964, Ser. No. 413,268
12 Claims. (Cl. 204—120)

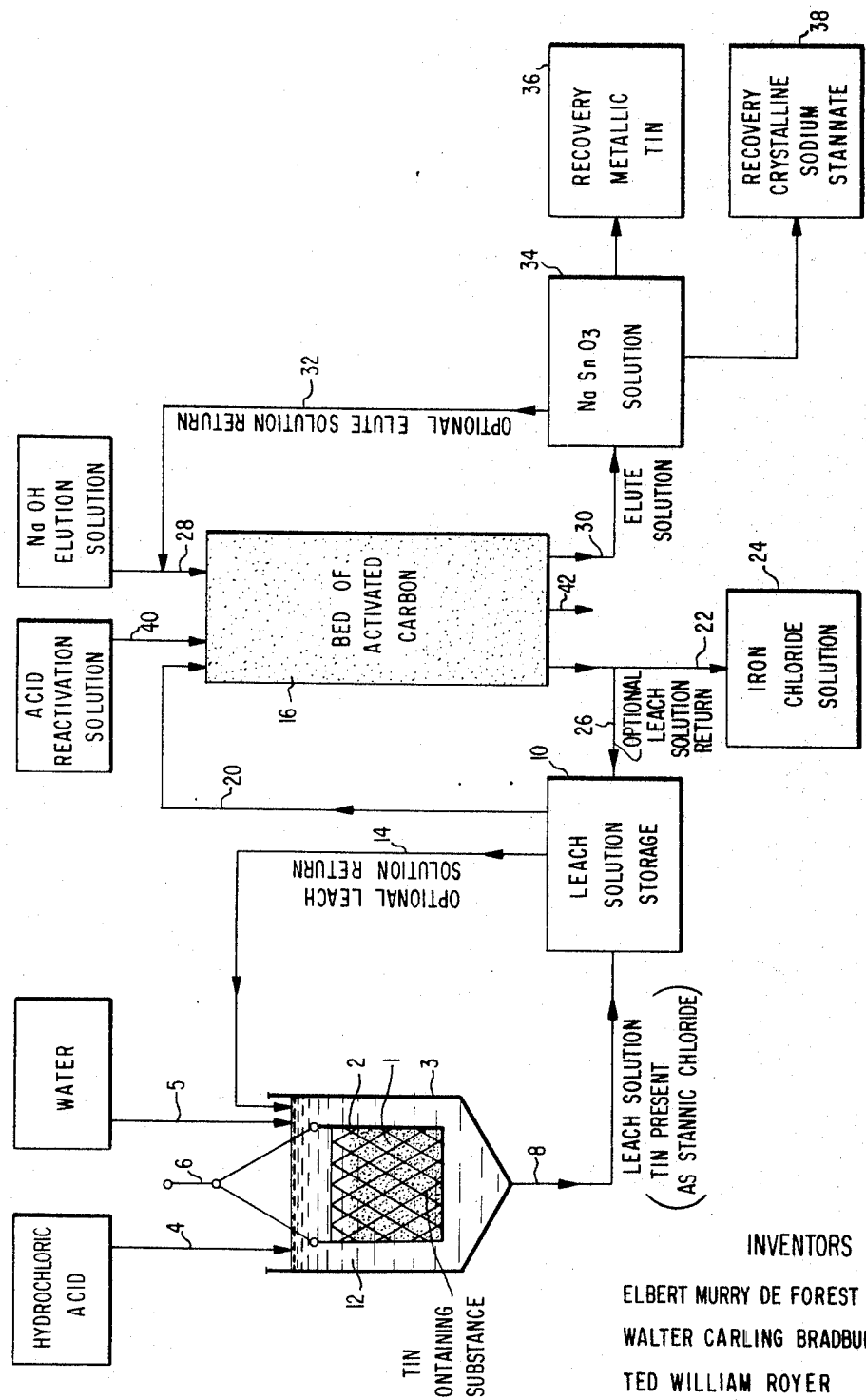

This invention concerns a process particularly suited for the recovery of tin from a wide variety of substances of low tin content, such as refuse by-products from detinning operations, tin mine wastes, mining slimes, etc. More particularly, the invention concerns a process wherein tin is efficiently separated from acidic solutions containing dissolved tin as well as other metals, such as iron.

In recent years the worldwide consumption of tin has steadily increased to a point where annual consumption exceeds annual output. This growing demand for tin has been attributed largely to the increased utilization of tinplate throughout the world by the food container industry, as well as the increased utilization of this metal in electronics applications. There has therefore been an increasing need for more efficient processes for the recovery of tin from tin-containing substances if the growing demand for tin throughout the world is to be met. For example, tin mining methods employed in some countries of the world produce waste by-products containing up to about fifty percent of the available tin, with waste materials containing about five to thirty percent tin being considered common. Also, detinning operations in which metallic tin is recovered from tin scrap may leave up to ten percent of the available tin unrecovered in the discarded refuse material. These and other readily available materials of low tin content are, therefore, recognized as holding great potential as sources for additional quantities of needed tin. Standard techniques, such as roasting, reduction, and physical-metallurgical separation methods, have largely proven to be commercially unsuccessful, however, when attempts have been made to recover tin from most tin-containing waste substances, i.e. from solids containing less than about ten percent tin.

It is an object of the invention to provide an improved process for the recovery of tin from tin-containing substances of low tin content.

It is a more specific object of the invention to provide a process for the recovery of tin from tin-containing waste materials, such as refuse material obtained as a by-product from the detinning of tin scrap.

It is a further object of the invention to provide a process for the recovery of tin from mining slimes.

It is another object of the invention to provide an efficient process for the selective recovery of tin from acidic solutions containing dissolved therein tin and other metals, such as iron.

Still another object is the production of high-purity sodium stannate from solutions containing a mixture of tin and iron salts.

These and other objects, as well as the scope, nature, and utilization of the invention will become more clearly apparent from the following description and appended claims.

Unless otherwise indicated, all proportions of materials are expressed herein on a weight basis.

The drawing illustrates a schematic flow diagram of an embodiment of the inventive process adapted for the recovery of tin either in the metallic form or as sodium stannate.

In carrying out the invention the normally solid substance from which tin is to be separated or recovered is extracted with an acid, namely dilute hydrochloric acid. For instance, the tin-containing substance in finely subdivided or granular form is brought into intimate contact with an aqueous solution of hydrochloric acid until a substantial quantity of tin in the substance is dissolved and an aqueous solution of stannic chloride is formed. As the tin-containing substance normally also contains other metals, such as iron, these will likewise be dissolved by the acid. The stannic chloride is next selectively separated by passing the resulting hydrochloric acid solution through a bed of activated carbon on which the stannic chloride is preferentially adsorbed. The stannic chloride is then eluted from the activated carbon with an aqueous solution of sodium hydroxide, whereby a solution of sodium stannate in an aqueous solution of sodium hydroxide is formed which is substantially free of other metals, such as iron, which may have been initially present in the tin-containing substance. If desired, metallic tin may be recovered from the resulting sodium hydroxide solution by any suitable means, such as electrodeposition, or pure sodium stannate may be recovered by crystallization.

The present process may be used to recover tin from a wide variety of tin-containing materials. The process has been found particularly useful for the recovery of tin from substances possessing a relatively low tin content, i.e. less than about ten percent tin. It is in this low concentration range that prior art tin recovery techniques have been largely unsatisfactory for commercial application. Tin present in such substances may be in either the oxidized or the reduced state. For example, oxidized tin or stannic oxide is commonly found in the essentially solid mass of refuse material from a detinning process because tin in the oxide state cannot be taken into solution in the usual detinning operation.

Tin scrap which is commonly subjected to a detinning process may be in the form of tinplate, stamping waste from the production of tin cans or bottle caps, or other tinned steel articles, or the scrap fed to the detinning process may comprise used cans formed from tinplate. In addition to tin and steel, such scrap therefore commonly contains dirt and dust, scraps of paper, residual resin from protective coatings, all of which become detached in the detinning operation. Eventually this material is pumped as an aqueous slurry from the detinning vat to residue ponds where a solid residue forms after the water evaporates. Through the utilization of the present process in excess of eighty percent of the remaining tin present in such tin-containing waste material may be efficiently recovered. The process may also be advantageously applied to tin-containing mining slimes, including Bolivian slimes, tin mine wastes, wet muds containing tin, or dilute solutions containing tin, as well as tin ores, such as those of the low grade type.

The acid selected for use in the present process is a relatively dilute solution of hydrochloric acid. Other mineral acids, such as sulfuric acid, have been tested and found to be only approximately fifty percent as effective as hydrochloric acid for leaching tin from most tin-containing solids. Also, the preferential adsorption of tin by activated carbon from a sulfuric acid solution has been found to be far inferior to that obtained from a hydrochloric acid solution. It is, of course, desirable when employing hydrochloric acid solutions that leaching conditions be selected so that the process will achieve a substantial tin recovery as well as acid economy. The principal reaction occurring in the leaching process can be represented by the following equation:

$$SnO_2 + 4HCl \rightarrow SnCl_4 + 2H_2O$$

It is preferred that the mole ratio of hydrochloric acid/tin be at least about 20 with a ratio of about 25 to 30 being particularly useful. Also, when an essentially solid tin-containing material is subjected to treatment according to the invention a liquid/solids ratio of between about 5/1 and 7/1, preferably between about 5.4/1 and 6.1/1, has been found to be particularly satisfactory. The concentration of the dilute hydrochloric acid solution employed may vary over a wide range of concentrations, and is preferably selected such that the above-specified ratio of hydrochloric acid/tin as well as the liquid/solids ratio is satisfied. When possible to satisfy the above-mentioned ratios, a concentration of about 5 to 7 percent hydrochloric acid by weight has been found to produce outstanding results.

A leaching period of about 15 to 30 minutes has been found adequate to efficiently obtain in excess of eighty percent of available tin in solution from most essentially solid tin-containing substances. While a slight amount of additional leaching may occur if the leaching period is extended in excess of about thirty minutes, such an extended leach period will generally not be worthwhile. In fact, it has been found that under certain leaching conditions the final quantity of tin leached from the tin-containing material may actually decrease slightly if the leaching period is extended beyond about thirty minutes. The temperature of the hydrochloric acid solution in the leaching step is desirably maintained between about 60 and 105° C., preferably between about 85 and 90° C.

Table I which follows summarizes results obtained by subjecting a tin-containing substance to a hydrochloric acid leach solution under various leach conditions.

wise diminish the useful life of the bed. At temperatures of between about 10° and 35° C. a flow rate of approximately 0.5 gal./min./sq. ft. of cross sectional bed area through a bed having a depth of about 5 ft. has been found to be particularly satisfactory. For efficient tin adsorption approximately 5 to 30 pounds, and preferably about 12 to 16 pounds, and most preferably about 14 pounds of activated carbon should be present in the bed for each pound of tin to be adsorbed.

Iron present in the tin-containing substance and subsequently dissolved in the aqueous hydrochloric acid solution fails to be adsorbed upon the bed of activated carbon, but rather remains in solution and tends to be reduced to ferrous chloride. Other metals, such as aluminum and lead, which may also be present in the tin-containing refuse likewise fail to interfere with the preferential adsorption of tin upon the activated carbon. The resulting iron chloride may be obtained from the acidic solution by known techniques after passage over the activated carbon bed and serve as a useful by-product of the tin recovery process.

The adsorbed tin is eluted or desorbed from the bed of activated carbon by the use of a dilute aqueous solution of sodium hydroxide. A solution formed by dissolving about 80 to 160 grams of sodium hydroxide per liter of water is preferred, i.e., an approximately 2 to 4 N sodium hydroxide solution. The elution may be conducted at a temperature of about 25° to 100° C., preferably at about 65° to 75° C. The principal reaction occuring in

TABLE I

| Run No. | HC., Weight Percent | Mole Ratio HCl/Sn | Liquid/ Solids Ratio | Percent Tin Leached/Time Interval Time, Minutes | | | | | | |
|---|---|---|---|---|---|---|---|---|---|---|
| | | | | 15 | 30 | 45 | 60 | 90 | 120 | 180 |
| 1 | 7 | 15 | 3.3 | 21.4 | 8.0 | | | | 1.3 | |
| 2 | 7 | 20 | 4.3 | 62.5 | 51.4 | 42.2 | 31.8 | 16.3 | 9.5 | |
| 3 | 7 | 25 | 5.4 | 82.0 | 84.2 | 82.3 | 82.2 | 79.1 | 75.1 | |
| 4 | 10 | 25 | 3.9 | 84.8 | 86.5 | 85.6 | 85.6 | 85.6 | 82.5 | 80.0 |
| 5 | 15 | 25 | 2.4 | 82.5 | 84.0 | 84.0 | 89.8 | 87.2 | 91.8 | |
| 6 | 15 | 50 | 4.9 | 86.8 | 89.1 | 91.1 | 91.1 | 91.1 | 93.8 | 90.2 |
| 7 | 5 | 25 | 6.1 | 85.3 | 88.9 | 85.0 | 81.0 | 73.0 | 61.0 | |

It is essential that the adsorbent carbon selected to form the bed through which the hydrochloric acid containing dissolved stannic chloride is passed by acitvated (surface area of about 500 to 2,000 sk. meters/gm.), and in a granular or otherwise subdivided state which will not impart undue resistance to liquid flow. Activated carbon of 12 x 40 mesh and having a surface area of about 1,000 to 1,100 square meters/gram has been found particularly satisfactory. 12 x 40 mesh CAL activated carbon available from the Pittsburgh Chemical Company may be employed. Unactivated hardwood charcoals have been found ineffective for carrying out the process. It is desirable that a liquid level be maintained over the activated carbon bed at all times the bed is in use in order to prevent the formation of air pockets and the subsequent channeling of the solution. Prior to the passage of the solution through the bed filtering may be required in order to remove suspended solid contaminants which might otherthe elution step can be represented by the following equation:

$$SnCl_4 + 6NaOHaq \rightarrow Na_2SnO_3 + 4NaCl + 3H_2O$$

If it is desired to employ a single pass of sodium hydroxide over the carbon bed at about 70° C. elution may be effected by using a mole ratio of sodium hydroxide to tin of about 70 at a flow rate of between about 0.5 and 1.0 gal./min./sq. ft. Alternatively, the sodium hydroxide solution may be recycled over the carbon bed. For example, an amount of solution containing about 12 moles of sodium hydroxide per mole of adsorbed tin may be passed over the bed at the accelerated flow rate of about 11 gals./min./sq. ft. to elute approximately 90 percent of the tin on the first pass, and the solution may be subsequently recycled until all of the adsorbed tin is eluted.

Following elution of the tin from the carbon bed reactivation of the bed may be accomplished by washing

TABLE II.—TIN ADSORPTION-ELUTION DATA

| Run No. | HCl Feed | | | | NaOH Elution | | | Percent Sn Recovered in NaOH Solution | Grams Sn Not Adsorbed | Total Sn Accountability, Percent |
|---|---|---|---|---|---|---|---|---|---|---|
| | Sn | | Fe, Weight Percent | HCl, Weight Percent | Grams per Liter | Total, Grams | Temp., ° C. | | | |
| | Weight Percent | Grams | | | | | | | | |
| 1 | 0.76 | 68.4 | 0.55 | 5.40 | 160 / 80 | 2,417 / 3,490 | 25 | 92.0 | 2.2 | 92.2 |
| 2 | 0.76 | 68.4 | 0.55 | 5.40 | 182 | 3,509 | 50 | 86.0 | 5.2 | 87.3 |
| 3 | 0.70 | 63.0 | 0.45 | 5.54 | 123 | 3,277 | 50 | 82.1 | 4.1 | 83.2 |
| 4 | 0.70 | 63.0 | 0.45 | 5.54 | 160 | 4,300 | 70 | 89.4 | 8.3 | 90.7 |
| 5 | 0.70 | 63.8 | 0.53 | 5.18 | 160 | 6,450 | 55-80 | 104.0 | 8.6 | 103.4 |
| 6 | 0.70 | 63.0 | 0.53 | 5.18 | 160 | 8,600 | 70 | 104.0 | 5.2 | 103.6 |
| 7 | 0.66 | 59.7 | 0.68 | 4.77 | 160 | 4,300 | 90-100 | 87.4 | 4.3 | 89.0 |
| 8 | 0.66 | 59.7 | 0.68 | 4.77 | 160 | 4,300 | 85-90 | 73.8 | 5.4 | 76.0 |
| 9 | 0.68 | 61.0 | 0.67 | 4.94 | 160 | 6,450 | 85-90 | 86.4 | 7.6 | 88.0 |
| 10 | 0.68 | 61.0 | 0.67 | 4.94 | 160 | 8,600 | 70 | 104.5 | 7.0 | 104.0 |
| 11 | 0.80 | 56.0 | 0.59 | 5.05 | 81 | 2,113 | 70 | 89.5 | 18.0 | 93.1 | with a dilute aqueous solution of hydrochloric acid until the effluent is acid to litmus. An examination of a carbon bed following ten elution-reactivation cycles showed no decrease in the effectiveness of the bed.

Table II above summarizes elution results obtained under various elution conditions.

A total of 9,000 grams of HCl feed was fed to each run at 50 cc./min. A 1,000 cc. water rinse was used after HCl and before caustic feed and a 2,000 cc. water rinse was employed at the completion of caustic addition. To reacidify the column 1,500 cc. of 5 percent HCl was used. CAL carbon, mesh 12 x 40, was used for runs 1–10. CAL carbon, mesh 12 x 16, was used for run 11. The activated carbon bed employed in all runs measured 3 feet in length by 2 inches in diameter. The NaOH elution solution in Run No. 11 was recirculated over the carbon bed for 90 minutes and then rinsed with water. A tin recovery in excess of 100 percent in Run Nos. 5, 6, and 10 is attributed to the fact that the same carbon bed was consecutively employed in Run Nos. 1 to 10, with a small additional quantity of tin from previous runs also being recovered in these runs.

Metallic tin may be recovered from the resulting sodium stannate solution by electroplating, immersion plating, or other known techniques. Alternatively, crystalline sodium stannate may be recovered from the solution by crystallization and subsequently used as a mordant in dyeing processes or for any other purpose to which this compound is commonly employed.

A satisfactory batch application of the present process may be conducted by placing the refuse from a detinning process or other tin-containing solid 1 within a permeable acid-resistant plastic basket 2 which may be lined with a filter cloth made of polyethylene terephthalate or similar acid resistant material. Hydrochloric acid and water of the proper concentration and temperature are added to the leaching vessel 3 by means of conduits 4 and 5 respectively to form leach solution 12. If desired the leaching vessel 3 may be provided with suitable heating means to accurately maintain the preferred acid leach temperature. The basket 2 may be suspended within leaching vessel 3 by means of a suitable suspension linkage 6. Following an appropriate leach period the leach solution containing stannic chloride dissolved therein is withdrawn from leaching vessel 3 by means of conduit 8 and conveyed to a suitable storage vessel 10. If desired, however, the leach solution 12 may be continuously recycled by means of conduit 14 during the leach period.

The resulting leach solution is next conveyed from storage vessel 10 to column 16 containing a bed of activated carbon by means of conduit 20 where stannic chloride present in the solution is preferentially adsorbed. At the lower portion of column 16 the solution is withdrawn by means of conduit 22. Iron chloride present in the solution may be recovered at 24. If desired, however, the solution may be recycled through the bed of activated carbon to obtain greater tin adsorption by use of conduits 26 and 20 prior to the recovery of iron chloride at 24. The adsorbed stannic chloride is next eluted from the bed of activated carbon by the adding of an aqueous solution of sodium hydroxide to the column 16 by means of conduit 28. This solution may be withdrawn by use of conduit 30 and if desired recycled through conduits 32 and 28. The sodium stannate solution formed is collected at 34 and may be further treated for the recovery of metallic tin at 36, or crystalline sodium stannate at 38 as heretofore discussed. The column 16 may be reactivated for further stannic chloride adsorption by the addition of a hydrochloric acid solution through conduit 40 with its removal through conduit 42.

Example

A 1,000 gram charge of an essentially solid tin-containing mud-like residue obtained as a by-product from a detinning operation was selected for treatment according to the present invention. An initial analysis of this detinning waste revealed the following composition:

| Components: | Weight percent |
|---|---|
| Sn as $SnO_2$ | 3.6 |
| Fe as $Fe_2O_3$ | 9.4 |
| Oragnics (combustibles at 600° C.) | 23.6 |
| Water (volatile at 110° C.) | 37.0 |
| $SiO_2$ | 26.4 |
| Also, traces of Al and Pb, etc. | ---- |
| Total | 100.0 |

The tin-containing waste was subjected to a dilute solution of 7 percent hydrochloric acid by weight for a period of 30 minutes at a temperature of 85–90° C. The mole ratio of hydrochloric acid/tin was 25 and the liquid/solids ratio was 5.4. During this period 84.2 percent of the tin present in the tin-containing waste was converted to stannic chloride. This resulting solution containing stannic chloride was filtered, and then passed across a carbon bed at a flow rate of approximately 0.5 gal./min./sq. ft. of cross-sectional area at ambient temperature. The bed was formed in a column three feet tall and two inches in diameter with 12 x 40 mesh activated carbon, type CAL, available from the Pittsburgh Chemical Company. Prior to use the carbon bed was packed by flotation with water in the usual manner. The adsorbed tin was eluted from the carbon bed by dilute sodium hydroxide at 70° C. having a concentration of 160 grams sodium hydroxide per liter of water at a flow rate of approximately 0.5 to 1 gal./min./sq. ft. of cross-sectional area. 100 percent of the adsorbed tin was recovered by employing a single pass of the solution having a mole ratio of sodium hydroxide to tin or 72. Metallic tin was recovered from the resulting solution of sodium stannate by electrodeposition.

Having fully described our invention what we claim is:

1. A process for the recovery of tin from an aqueous solution containing a tin salt and an iron salt of a mineral acid dissolved therein which comprises contacting said aqueous solution with activated carbon, thereby selectively adsorbing said tin salt, and eluting said tin salt from activated carbon with an aqueous solution of sodium hydroxide.

2. A process according to claim 1 wherein said salt-forming mineral acid is hydrochloric acid.

3. A process according to claim 2 in which the aqueous solution of sodium hydroxide is about 2 to 4 N.

4. A process for the recovery of tin from a tin-containing substance which comprises bringing said tin-containing substance into intimate contact with an aqueous solution of hydrochloric acid, thereby forming a solution of stannic chloride in aqueous hydrochloric acid, passing said stannic chloride solution through a bed of activated carbon, thereby selectively adsorbing said stannic chloride, eluting stannic chloride from said activated carbon with an aqueous solution of sodium hydroxide, thereby forming a solution of sodium stannate in sodium hydroxide, and recovering tin from said sodium stannate solution.

5. A process for the recovery of metallic tin from a tin-containing substance according to claim 4 in which metallic tin is recovered from the sodium stanate solution by electrodeposition.

6. A process for the recovery of metallic tin according to claim 4 in which the tin-containing substance is in the form of a mud-like residue from a detinning process which comprises between about 0.5 and about 10 percent tin by weight.

7. A process for the recovery of metallic tin according to claim 4 in which the tin-containing substance is a mining slime.

8. A process for the recovery of tin from an essentially solid tin-containing substance which comprises intimately contacting said tin-containing substance with an aqueous solution of hydrochloric acid for a period of about 15 to 30 minutes, said hydrochloric acid being at a temperature of about 85 to 90° C. and of such a concentration that the mole ratio of hydrochloric acid/tin present in said tin-containing substance is about 25 to 30 and the liquid/solids ratio is between about 5/1 and 7/1; passing the resulting salt solution at a temperature between about 10 and 50° C. through a bed of finely divided activated carbon having a surface area between about 500 and about 2,000 square meters per gram, eluting said bed of activated carbon with an aqueous solution of about 2 to 4 N sodium hydroxide at a temperature of between about 25° and 100° C., thereby converting adsorbed stannic chloride to sodium stannate, and withdrawing the resulting sodium stannate solution.

9. A process according to claim 8 wheren elution of said carbon bed with aqueous sodium hydroxide is conducted at a temperature between about 65° and about 75° C.

10. A process for the recovery of tin according to claim 8 in which the tin-containing substance is in the form of a mining slime.

11. A process for the recovery of tin from a tin-containing substance according to claim 8 in which metallic tin is obtained from the sodium stannate solution by electrodeposition.

12. A process for the recovery of tin according to claim 8 in which the tin-containing substance is a mass of refuse material from a detinning process which includes less than about ten percent tin by weight.

References Cited

UNITED STATES PATENTS

| 1,511,590 | 10/1924 | Buttfield | 204—121 |
| 1,620,580 | 3/1927 | Smith | 75—97 |
| 1,806,310 | 5/1931 | Robinson | 75—97 |
| 2,250,843 | 7/1941 | Robinson | 204—122 |
| 2,319,887 | 5/1943 | Stack | 75—121 |
| 3,109,732 | 11/1963 | Goren | 75—101 |

FOREIGN PATENTS 312,924  5/1929  Great Britain.

JOHN H. MACK, *Primary Examiner.*

H. M. FLOURNOY, *Assistant Examiner.*